(12) United States Patent
Susnjara

(10) Patent No.: US 9,440,321 B2
(45) Date of Patent: Sep. 13, 2016

(54) SYSTEM FOR POSITIONING A WORKPIECE ON A MACHINE WORKTABLE

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 333 days.

(21) Appl. No.: 14/275,141

(22) Filed: May 12, 2014

(65) Prior Publication Data

US 2015/0321304 A1 Nov. 12, 2015

(51) Int. Cl.
*B23Q 16/00* (2006.01)
*B23Q 3/18* (2006.01)
*B23Q 3/08* (2006.01)
*B27C 9/00* (2006.01)

(52) U.S. Cl.
CPC .............. *B23Q 3/18* (2013.01); *B23Q 3/088* (2013.01); *B23Q 3/186* (2013.01); *B23Q 16/00* (2013.01); *B23Q 16/001* (2013.01); *B27C 9/00* (2013.01); *B23Q 16/006* (2013.01); *Y10T 409/308624* (2015.01)

(58) Field of Classification Search
CPC .......... Y10T 409/308624; Y10T 409/308736; B23Q 16/001; B23Q 16/006; B23Q 3/186; B23Q 3/088; B23Q 15/20; B23Q 15/22
USPC .......... 269/303–305, 315, 317, 319; 33/573; 29/33 P
See application file for complete search history.

(56) References Cited

U.S. PATENT DOCUMENTS

| | | | | |
|---|---|---|---|---|
| 930,744 A * | 8/1909 | Dunbar | B27B 27/04 269/319 |
| 2,595,079 A * | 4/1952 | Itaya | C03B 33/12 269/297 |
| 2,738,692 A * | 3/1956 | Jones | B21D 22/00 408/103 |
| 3,284,884 A * | 11/1966 | Prazak, III | H01J 29/073 269/319 |
| 4,061,437 A * | 12/1977 | Strange | B23B 39/167 144/365 |
| 4,407,614 A * | 10/1983 | Muhr | B21D 28/243 408/12 |
| 4,621,797 A * | 11/1986 | Ziegenfuss | B25B 5/061 269/238 |
| 4,797,989 A * | 1/1989 | Cherko | B23Q 3/15526 198/345.3 |
| 5,108,242 A * | 4/1992 | Fisher | B25H 1/0042 269/127 |
| 6,328,507 B1 * | 12/2001 | Shoda | B23Q 1/032 269/21 |
| 6,543,973 B2 * | 4/2003 | Lapikas | B23Q 16/001 269/303 |
| 6,830,416 B2 * | 12/2004 | Susnjara | B23Q 17/002 144/278.3 |
| 7,374,373 B1 * | 5/2008 | Park | B23B 39/003 408/103 |

FOREIGN PATENT DOCUMENTS

DE 2407991 A1 * 9/1975

* cited by examiner

*Primary Examiner* — Daniel Howell
(74) *Attorney, Agent, or Firm* — Bookoff McAndrews, PLLC

(57) ABSTRACT

A system for positioning a workpiece on the worktable of a machine including at least one stop device mounted on such machine, including a first component provided with a fluid passageway having an inlet connected to a fluid pressure line including a pressure sensor, and an outlet disposed in an abutment surface thereof, and a second component displaceable relative to such abutment surface, into and out of obstructive relation with such outlet, affecting the pressure in such supply line and correspondingly effecting a hold down of a workpiece positioned on such worktable.

25 Claims, 4 Drawing Sheets

SYSTEM FOR POSITIONING A WORKPIECE ON A MACHINE WORKTABLE

This invention relates to a system for positioning a workpiece on the worktable of a machine and more particularly to a system for expeditiously positioning sheets of material on the worktable of a CNC router for the purpose of consistently, accurately and repeatedly performing programmed machining operations thereon.

BACKGROUND OF THE INVENTION

Conventional CNC router machines used to cut and shape a variety of products, often sheets of material consisting of plywood or particleboard, typically include a bed, a worktable mounted on such bed for supporting workpieces to be machined, a gantry mounted on such bed displaceable relative to such worktable along an x-axis, a tool support carriage mounted on such gantry displaceable relative to such worktable along a y-axis, a tool holder mounted on such carriage displaceable relative to such worktable along a z-axis and a control unit for displacing such components along such axes pursuant to a selected operating program. Such machines further typically are provided with stop devices for positioning workpieces on the worktables thereof, means for assuring the proper dispositions of the workpieces relative to the stop devices and means for detachably securing the suitably positioned workpieces on the worktable for commencing the machining operation.

In the effective use of such systems, it is required that workpieces be firmly pressed against the stop defining surfaces of such devices before the conjoining mechanism is activated and the machining operation is commenced. Often, however, operators fail to sufficiently maneuver workpieces against such stop devices resulting in misalignment of the workpieces, offsetting of the machining patterns and scrapping of the workpieces. In seeking to more effectively position such workpieces, electrical sensing devices have been employed. However, such electrical devices have been found not to be entirely effective in signaling the proper positioning of a workpiece, thereby restraining the workpiece and commencing the machining operation.

In view of the foregoing, the principal object of the present invention is to provide an improved means for accurately positioning a workpiece on the worktable of a machine operable to perform a programmed machining function on such workpiece.

Another object of the present invention is to provide system for commencing the execution of a programmed machining routine on a workpiece positioned on a worktable upon suitable positioning and restriction of such workpiece on such table.

A still further object of the present invention is to provide a system functional to accurately position and secure a workpiece on the worktable of a machine requiring a minimal effort and discretion of a machine operator.

SUMMARY OF THE INVENTION

The objectives of the invention are achieved by a system for positioning a workpiece provided with a pair or angularly displaced edges, on the worktable of a machine, provided with a pair of angularly displaced edges, generally including at least one workpiece stop device supported on such machine, adjacent each of such angularly displaced worktable edges, including a first component provided with a fluid passageway therethrough including inlet, and outlet ports, and a second component displaceable by an engaging edge of a workpiece disposed on such worktable, along a line of travel intersecting the outlet port of such first component, functional to close such outlet port; means for supplying a fluid under a first pressure to such passageway inlet; and means responsive to a second pressure in such fluid supply means, greater than such first pressure, operative to secure such workpiece in a required position on such worktable.

In a preferred embodiment of the invention, upon displacement of an edge of a workpiece disposed on the worktable of the machine against each second device component, resulting in a blockage of the fluid outlet port of a cooperating first device component and the attainment of such second pressure in the fluid supply system, such condition is sensed to cause a vacuum pump to operate in applying a vacuum to a plenum below a porous worktable upon which such workpiece is properly situation, rigidifying its position. In a still further embodiment of the invention, each of such stop devices is pivotally mounted on the bed of the machine, adjacent the worktable of the machine, and is angular displaceable between an upper, operable position engageable by an edge of a workpiece disposed on the worktable of the machine, and a lower, inoperable position.

DETAILED DESCRIPTION OF THE PREFERRED EMBODIMENT OF THE INVENTION

Figure 1:
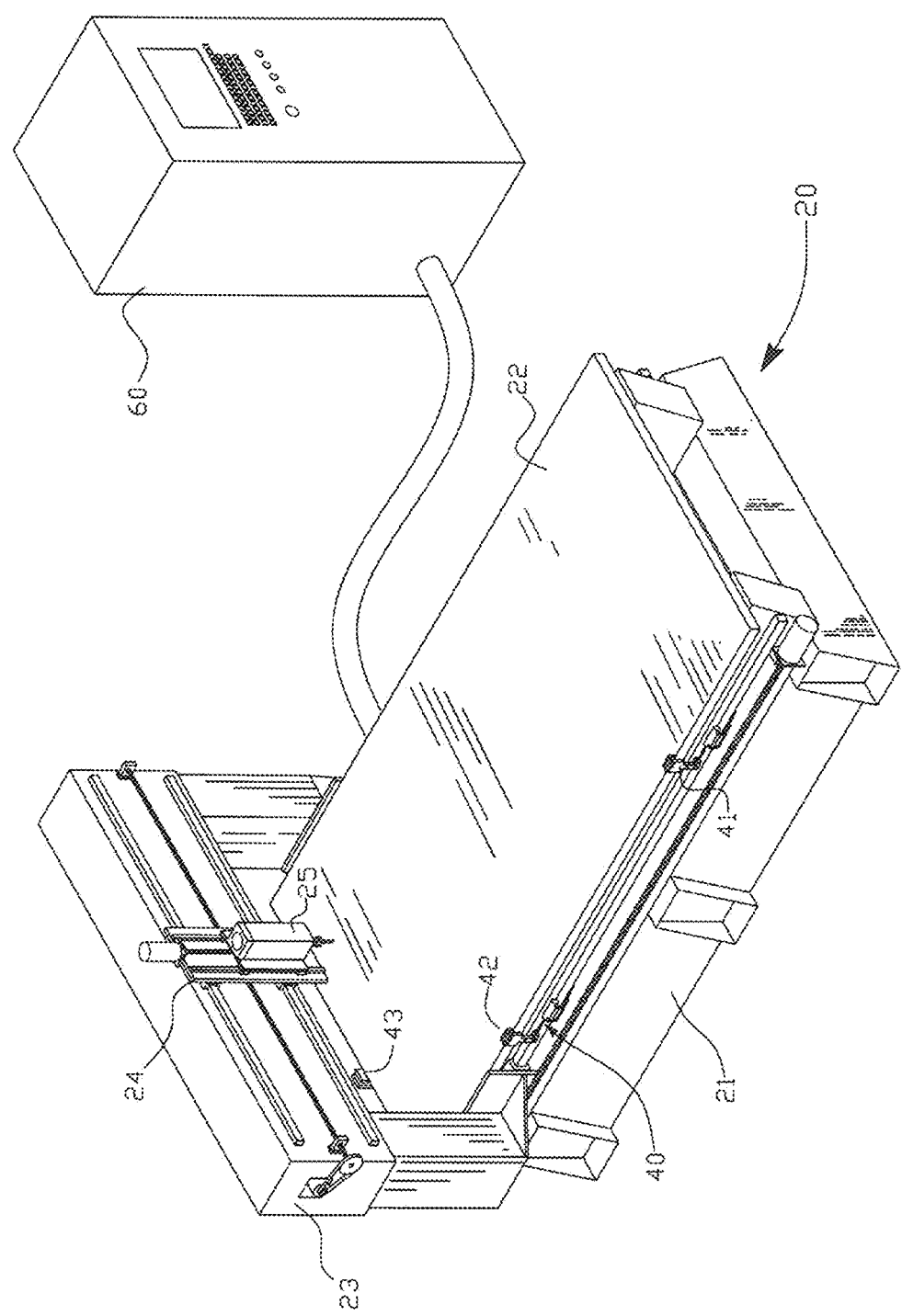
FIG. 1 is a perspective view of a CNC router machine with which the present invention is used, and a controller therefor.

Referring to FIG. 1 of the drawings, there is shown a CNC router machine 20 operable to machine sheets of material formed of plywood or particle board, a system 40 functional to sense and signal a proper positioning of a sheet to be machined on the worktable of such machine and a unit 60 functional to operate such machine upon receipt of a signal of such system indicating a proper positioning of such sheet on such machine. Typically, such machine includes a bed unit 21, a rectangularly configured worktable 22 mounted on such bed unit, a gantry 23 supported on such bed and displaceable along a longitudinal or x-axis, a tool carriage 24 mounted on the gantry and displaceable along a transverse or y-axis and a tool holder 25 mounted on the tool carriage and displaceable along a vertical or z-axis. The travel of the several displaceable components is affected by several servo motors controlled by unit 60 pursuant to various inputted programs. Bed unit 21 includes a chamber closed by worktable 22 which is porous in substance. Workpieces suitably positioned on worktable 22 for machining are secured by means of a vacuum applied to such chamber provided by a vacuum pump 26 as shown in FIGS. 5 and 6, controlled by unit 60.

Figure 5:
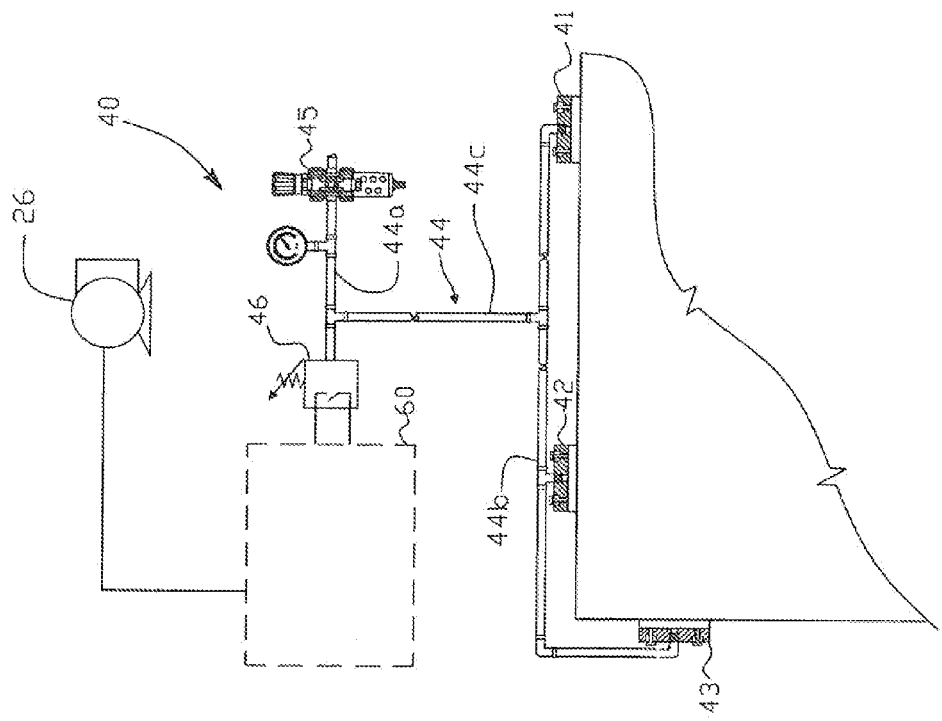
FIG. 5 is a partial top plan view of the worktable shown in FIGS. 1 and 2 including a schematic of an operating system embodying the present invention, illustrating a number of the stop devices shown in FIGS. 1 through 4, each disposed in a condition precluding the operation of such system.
Figure 6:
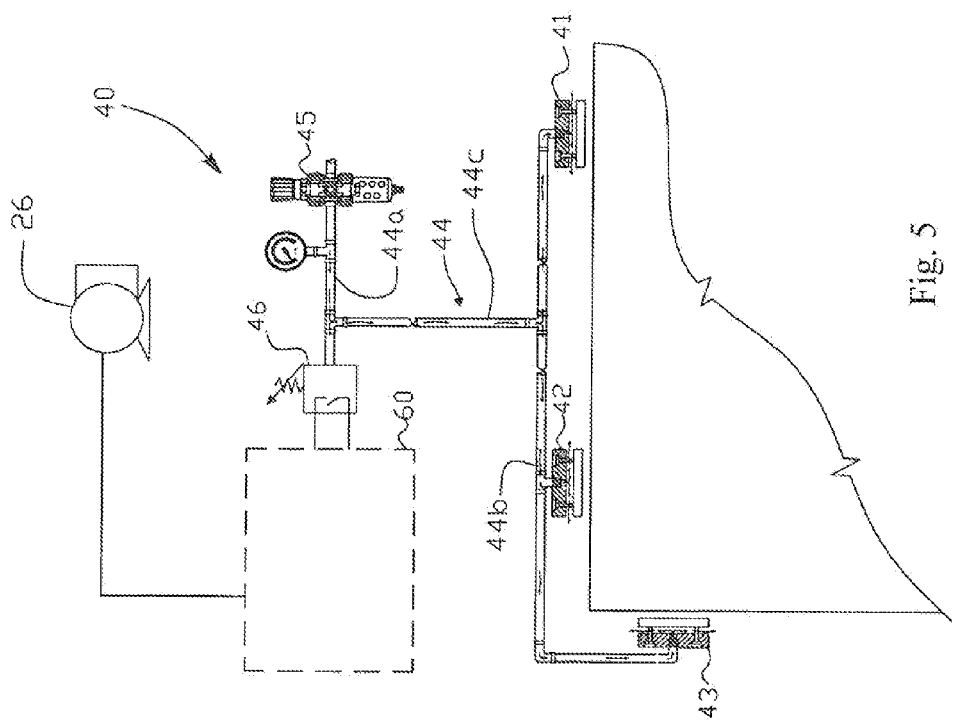
FIG. 6 is a view similar to the view shown in FIG. 5, including each of the stop devices in a condition permitting the operation of such system.

As shown in FIGS. 5 and 6, system 40 includes a set of stop devices 41, 42 and 43 mounted on bed 21 of the machine, about a partial perimeter of the worktable 22, and an air supply line 44 interconnecting a source of air under pressure and each of the stop devices, in parallel. Such supply line includes a branch 44a connected to the pressurized air source and including an air pressure regulator 45 and a pressure sensing switch 46, a flexible branch 44b connected to each of stop devices 41, 42 and 43 and a branch line 44c interconnecting branch lines 44a and 44b. Pressure switch 46 is operationally connected to control unit 60, functional to signal unit 60 to activate vacuum pump 26 upon sensing a predetermined upper pressure in air supply line 44.

Figure 2:
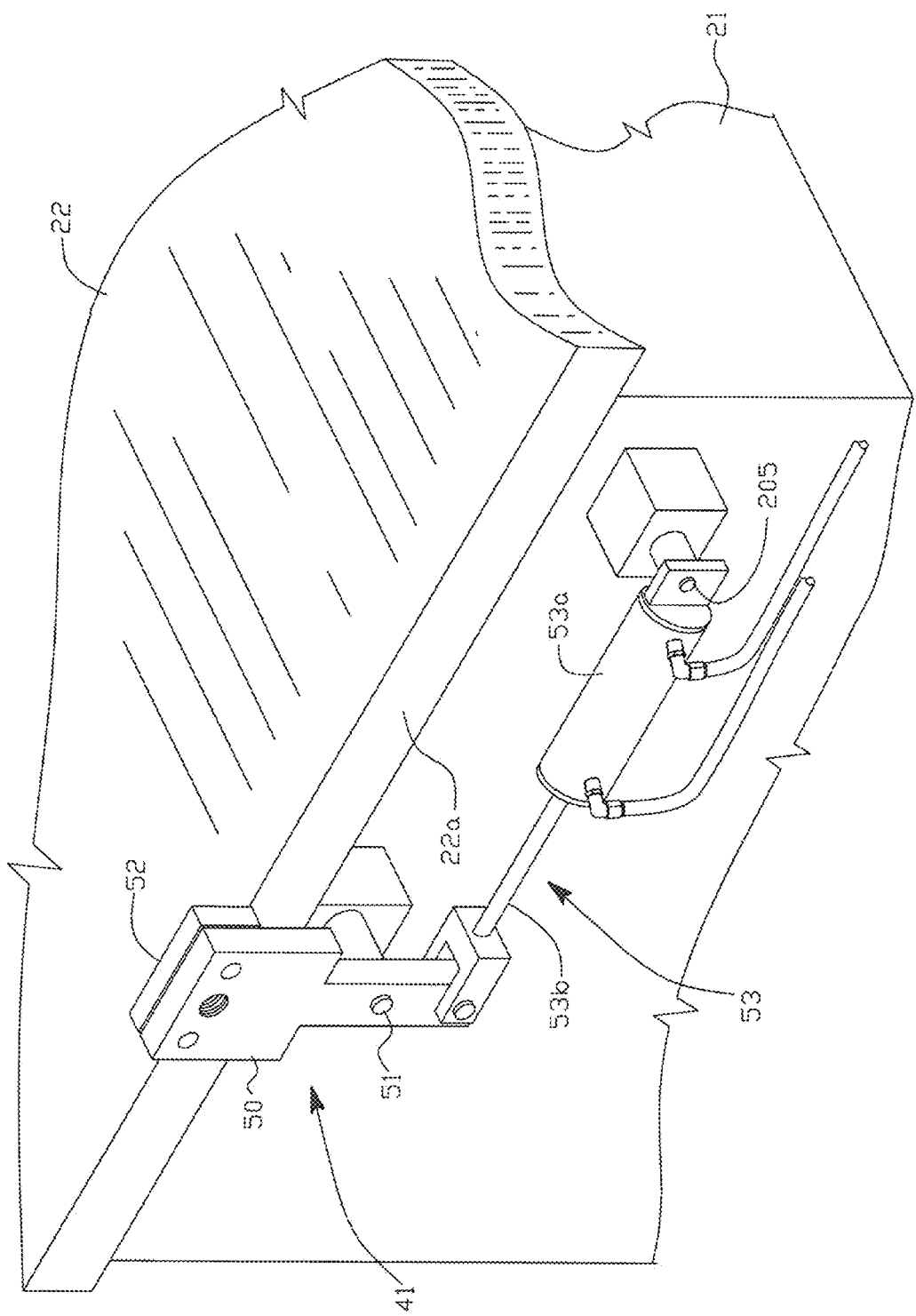
FIG. 2 is an enlarged partial view of the machine shown in FIG. 1, illustrating a stop device mounted on the bed of the worktable shown in FIG. 1.
Figure 3:
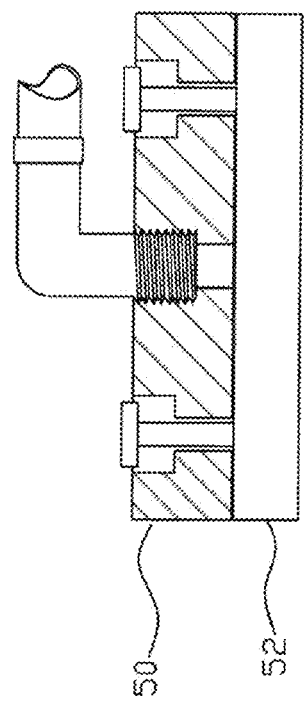
FIG. 3 is an enlarged, top plan view of the stop device shown in FIG. 2, illustrating a first component thereof in section and a second component thereof in spaced relation to such first component.
Figure 4:
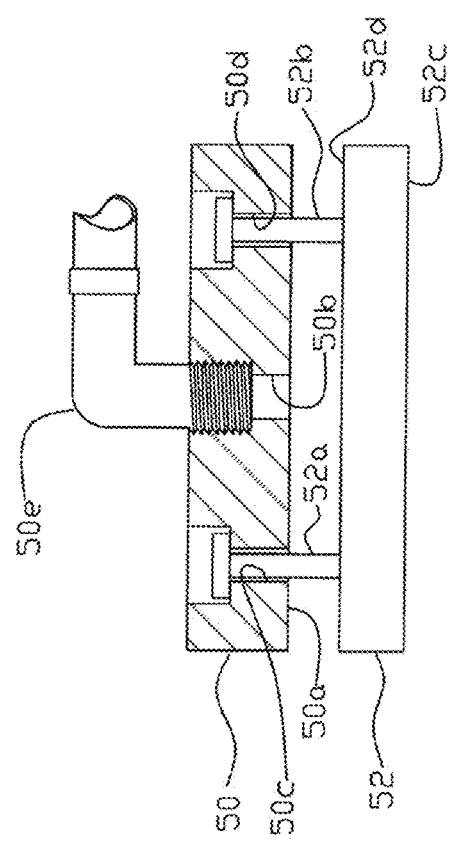
FIG. 4 is a view similar to the view shown in FIG. 3, illustrating the second component thereof in abutting relation with such first component.

As best shown in FIGS. 2 through 4, each of the stop devices includes a base component 50 pivotally connected to a pin 51 mounted on bed unit 21, projecting laterally therefrom, and having an axis disposed parallel to tool carriage displacement axis-y, and a cooperating component 52. Component 50 is displaced from worktable edge 22a and is selectively displaceable between an upright, operative position as shown in FIG. 2 and a downward, inoperative position by means of a cylinder assembly 53 including a cylinder 53a pivotally connected at a base end thereof to machine base 21 and connected to a source of air under pressure, and a rod 53b pivotally connected to an end portion of component 50. Base component 50 with cooperating component 52 is pivotal in a vertical plane spaced from worktable edge 22a, between an upright functional position as shown and a downward nonfunctional position.

Referring to FIGS. 3 and 4, the upper end of base component 50 is provided with an abutment surface 50a disposed in a vertical plane, a centrally disposed air passageway 50b including an inlet and an outlet port disposed in abutment surface 5a, and a pair of laterally spaced guide slots 50c and 50d disposed parallel to passageway 50b. Mounted in the inlet port of passageway 50b is a fixture 50e which communicates with flexible air supply branch line 44b. Cooperating component 52 is displaceable along a line of travel disposed orthogonally relative to abutment surface 50a of the base component, between a spaced position as shown in FIG. 3 and a closed position as shown in FIG. 4. Such component has a substantially rectangular configuration and is guided along such line of travel by a pair of guide pins 52a and 52b received in guide slots 50c and 50d of the base component, provided with enlarged head portions disposable in enlarged end positions of guide slots 50c and 50d, limiting the displacement of component 52 relative to base component 50, as shown in FIG. 3. Displaceable component 52 further is provided with an outer surface 52c engageable by an edge of an workpiece disposed on worktable 22, and a parallel surface 52d engageable with abutment surface 50a. Upon engagement of an edge of a workpiece loaded onto worktable 22 with surface 52c of component 52, and displacement of such workpiece along the line of travel of component 52, such component will be caused to displace between the position shown in FIG. 3 with the outlet of passageway 50b unobstructed to the position shown in FIG. 4 with such outlet being substantially obstructed.

Stop devices 42 and 43 are structurally and functionally similar to device 41. Stop devices 41 and 42 are spaced along one edge of the worktable and stop device 43 is disposed along another edge of the worktable angularly displaced relative such one edge to accommodate a workpiece having comparable angularly displaced edges engageable with the displaceable components of such devices.

In the use of the system as described, with air under pressure having been supplied to supply line 44, pressure regulator having been set at a selected low pressure, pressure valve 46 in the dosed condition and a sheet of material to be machined, having angularly displaced edges, having been loaded onto the worktable of the machine, the machine operator would shift the loaded workpiece either sequentially or simultaneously to cause a first edge of the workpiece to engage and displace the displaceable components into engagement with the fixed components of stop devices 41 and 42, obstructing the flow of air through such devices and correspondingly causing the pressure in supply line 44 to increase an increment, and a second edge of the workpiece to engage and displace the displaceable component into engagement with the fixed component of stop device 43, obstructing the flow of air through such third device and correspondingly causing the pressure in supply line 44 to increase a further increment sufficient to close pressure switch 46, signaling unit 60 to operate pump 26 to produce a vacuum in the chamber below porous worktable 21, causing the loaded workpiece to releasably adhere to the worktable in a position determined by the dispositions and operation of the stop devices. With the workpiece thus fixed in the proper location on the worktable, the operator may operate cylinder assemblies 53 to displace the stop devices to lower positions and then operate the controls of the machine to provide a programmed machining function on the suitably positioned workpiece. If required, upon completion of a machining operation on the first side of the workpiece, the system may be deactivated to free the workpiece, the freed workpiece may be inverted and repositioned in the manner described, and with the workpiece again being suitably positioned and adhered to the worktable, the operation of the machine may be resumed to machine the inverted side of the workpiece.

Unlike prior art devices and methods, the described system functions to fix the positioning of a workpiece only when the workpiece is suitably positioned on the worktable. Such system is not only effectual functionally but simple in design, comparatively inexpensive to assemble and install and reliable in performance.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A system for positioning a workpiece provided with a pair of angularly displaced edges, on the worktable of a machine, provided with a pair of angularly displaced edges, comprising:
   at least one workpiece stop device supported on said machine adjacent each of said angularly displaced worktable edges, including a first component provided with a fluid passageway therethrough including an inlet port and an outlet port, and a second component displaceable by an engaging edge of a workpiece disposed on said worktable along a line of travel intersecting said outlet port of said first component, functional to close said outlet port;

means for supplying a fluid under a first pressure to said passageway inlet;

means responsive to a second pressure in said fluid supply means effected by a closure of said outlet port of said first component by said second component, greater than said first pressure, operative to conjoin said workpiece and said worktable.

2. A system according to claim 1 wherein said first component includes an abutment surface including said outlet port engageable by a surface of said second component displaced along said line of travel, closing said outlet port.

3. The system according to claim wherein said second component includes at least one pin having an end portion thereof inserted into a channel of said first component for guiding said second component along said line of travel.

4. The system according to claim 1 including at least one of said devices disposed adjacent an end of said worktable and at least two of said devices spaced apart and adjacent a side of said worktable.

5. The system according to claim 1 wherein said fluid supply means includes a pressure regulator and a pressure sensitive switch disposed between said stop device and said pressure regulator.

6. The system of claim 5 wherein said pressure regulator is functional to maintain said fluid supply means at said first pressure.

7. The system according to claim 5 wherein said pressure sensitive switch is functional to close responsive to said second pressure in said fluid supply means.

8. The system according to claim 1 wherein said workpiece is conjoined to said worktable by means of the application of a vacuum thereto.

9. The system according to claim 5 wherein said, machine includes a bed unit provided with a chamber having an open end, said worktable is formed of a porous material and overlies said chamber open end, said pressure sensitive switch is functional upon sensing said second pressure to signal a controller of said machine to operate a vacuum pump, causing said pump to apply a vacuum in said chamber sufficient to secure said workpiece on said worktable, engaging, said devices.

10. The system according to claim 1 wherein said machine is a CNC router.

11. The system according to claim 1 wherein each of said stop devices is disposed laterally of an edge of said worktable and is pivotal in a vertical plane.

12. The system of claim 11 including means operatively interconnecting the bed unit of said machine and said stop device for pivoting said device about an axis.

13. The system according to claim 11 including a shaft supported on the bed of said machine and wherein said first component of said stop device includes a head portion including said fluid passageway and an integral depending portion rotatably mounted on said shaft.

14. The system according to claim 13 including means operatively interconnecting the bed unit of said machine and said first component operable for pivoting said stop device about said shaft.

15. The system according to claim 12 wherein said interconnecting means comprises a pneumatically operable cylinder assembly.

16. The system according to claim 11 wherein said first component includes an abutment surface including said outlet port, engageable by a surface of said second component displaced along said line of travel, closing said outlet port.

17. The system of claim 11 wherein said second component includes at least one pin having an end portion thereof inserted into a channel of said first component for guiding said second component along said line of travel.

18. The system of claim 11 including at least one of said devices disposed adjacent an end of said worktable and at least two of said devices spaced apart and adjacent a side of said worktable.

19. The system of claim 11 wherein said fluid supply means includes a pressure regulator and a pressure sensitive switch disposed between said stop device and said pressure regulator.

20. The system of claim 19 wherein said pressure regulator is functional to maintain said fluid supply means at said first pressure.

21. The system of claim 19 wherein said pressure sensitive switch is functional to close responsive to said second pressure in said fluid supply means.

22. The system of claim 11 wherein said workpiece is conjoined to said worktable by means of the application of a vacuum thereto.

23. The system of claim 19 wherein said machine includes a bed unit provided with a chamber having an open end, said worktable is formed of a porous material and overlies said chamber open end, said pressure switch is functional upon sensing said second pressure to signal a controller of said machine to operate a vacuum pump, causing said pump to apply a vacuum in said chamber sufficient to secure said workpiece on said worktable, engaging said devices.

24. The system of claim 11 wherein said machine is a CNC router.

25. A stop assembly mountable on the bed of a machine provided with a worktable for supporting a workpiece thereon, functional to fix the position of an edge of said workpiece, comprising:

a shaft supportable on said bed, having an axis disposed substantially parallel to a support surface of said worktable;

a first stop component pivotally mounted on said shaft provided with an abutment surface facing in the direction of said machine, and a fluid passageway including an inlet connectable to a source of fluid under pressure and an outlet in said abutment surface;

a second stop component supported on said first component, displaceable relative to said first stop component along a line of travel including said fluid outlet port in said abutment surface of said first stop component, and including a first surface intersecting said line of travel disposed in opposed relation to said abutment surface and a second surface intersecting said line of travel engageable by an edge of a workpiece disposed on said worktable; and a fluid operated cylinder assembly including a cylinder mountable at a base end thereof to said bed and a rod connectable to said first stop component.

* * * * *

UNITED STATES PATENT AND TRADEMARK OFFICE
CERTIFICATE OF CORRECTION

PATENT NO.        : 9,440,321 B2
APPLICATION NO.   : 14/275141
DATED             : September 13, 2016
INVENTOR(S)       : Kenneth J. Susnjara Page 1 of 1

It is certified that error appears in the above-identified patent and that said Letters Patent is hereby corrected as shown below:

In the Claims

Claim 3, column 5, line 18, "claim wherein" should read --claim 1 wherein--.

Claim 3, column 5, line 39, "said, machine" should read --said machine--.

Signed and Sealed this
Eighth Day of November, 2016

Michelle K. Lee
*Director of the United States Patent and Trademark Office*